L. A. BUTTS.
Corn-Planter.
No. 12,990.
Patented June 5, 1855.
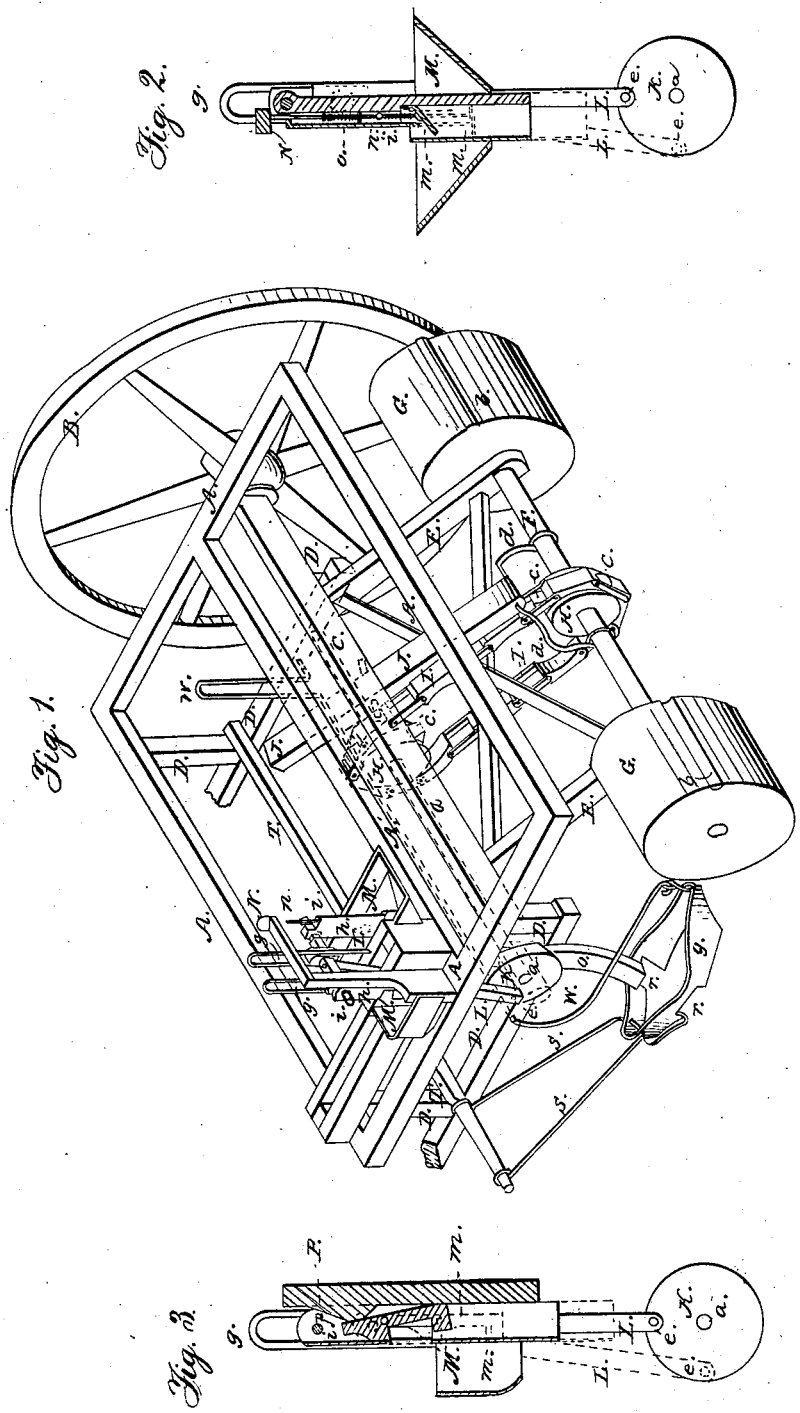

UNITED STATES PATENT OFFICE.

LUCIEN A. BUTTS, OF CUBA, NEW YORK.

IMPROVEMENT IN SEED-PLANTERS.

Specification forming part of Letters Patent No. 12,990, dated June 5, 1855.

*To all whom it may concern:*

Be it known that I, LUCIEN A. BUTTS, of Cuba, in the county of Allegany and State of New York, have invented certain new and useful Improvements in Corn or other Seed Planting Machines; and I do hereby declare the following to be a full, clear, and exact description of the same, reference being had to the accompanying drawings, making a part thereof, in which—

Figure 1 represents a perspective view of the machine. Fig. 2 represents a vertical section through one of the hoppers and seed-tubes; and Fig. 3 represents a similar vertical section through another hopper and tube, which may be used for sowing plaster, lime, guano, or other material with the seed, the different devices in the two hoppers being obvious modifications of each other.

Similar letters in the several figures denote like parts.

The nature of my invention consists in raising the seed to be planted up in a cup or cell vertically, or nearly so, entirely above the height of the grain in the hopper and then tripping a valve in the bottom of said cup or cell and allowing the seeds contained therein to drop through a tube toward the ground, where they are to be planted.

To enable others skilled in the art to make and use my invention, I will proceed to describe the same with reference to the drawings.

A represents the frame of the planter, supported on carrying-wheels B, one being removed to better show the parts behind it. The wheels are supporting or carrying wheels only, and do not drive any of the operative parts of the machine, and thus any ordinary wagon-wheels may be used without duplicating on the farmer his necessary implements of husbandry.

C is the axle of the wheels B, over which is placed the central cross-piece of the frame A', to which and to the front cross-piece is framed an under frame, D.

On a shaft, $a$, (in dotted lines,) on the frame D is hinged by arms E an axle, F, which, as well as the shaft $a$, freely turns in said arms, and on said axle F, near its ends, or at such suitable distance as the furrows are required to be apart, are placed the rollers G, provided with markers $b$. These rollers have a triple function—viz., to drive the operative parts of the machine, to press the earth over the planted seed, and, lastly, to mark the spot where the seeds are planted to govern the dropping on its return over the ground.

On or about the centers of the shaft $a$ and axle F are placed rag or toothed pulleys H, provided with suitable teeth, $c$, over and on which pass the links of an endless chain, I, to give motion to $a$ without slipping and through $a$ to the moving parts of the machine.

J is a lever pivoted to the axle $c$, the rear end of which is connected by a stirrup-strap, $d$, to the axle F, and the front end of said lever is conveniently located, so that the operator may at any time raise up the rollers G from the ground, so that the machine may move without driving the seeding apparatus, either in moving it to or from the field, or backward or forward to match the markings, and thus make straight cross-rows.

On the ends of the shaft $a$ (one only being represented in the drawings) are placed crank-wheels K to a wrist-pin, $e$, in which is connected a pitman, L, the upper end of said pitman being attached to a cross-head, $f$, which moves up and down in guides $g$, and to this cross-head is connected the seeding slides or bars $h$. (Seen on a larger scale in Figs. 2, 3.)

M M' are two hoppers, one for the grain which is to be planted and the other for lime, ashes, guano, or other fertilizer to be sown with the grain, the use of both or one only depending upon the fancy of the user. The lower ends of the slides or bars $h$ are hollow, and their upper ends are encased in a shield, $i$, which may be made adjustable by means of the holes 1 2 3, Fig. 1, to change the caliber of the cup formed therein for receiving and carrying up the seeds from the hopper.

$m$ is the valve which works in the seeding slide or bar, and this valve, being hinged, may be opened and closed, as seen in Figs. 2, 3. In Fig. 2 the valve is connected to a rod, $n$, controlled by a helical spring, $o$, and as the seed-bars move upward the rod $n$ strikes against a projecting arm, N, Figs. 1, 2, which forces down the valve $m$, opening it, and allowing the seed to drop through into the tube O, thence into the furrow, the spring $o$ closing the valve when the slide or bar $h$ descends. In Fig. 3, which is a modification of the other plan, the valve $m$ strikes against a cam, P, Fig. 3, which swings it open, and said valve again closes, when the slide or bar $h$ descends by its own weight, instead of the spring, though a spring may be used behind it, if found necessary. The red lines in Figs. 2, 3 show the slides or bars $h$ down in the hopper, with the valve $m$ closed, forming a cup into which the necessary quantity of grain to be planted is received, and the black lines show the same slides raised up and the valves opened to allow the grain to drop through into the furrow, the object of this construction and operation being to raise the exact quantity of seed to be planted up out of the hopper clear of the mass or bulk and then allow it to drop through into the furrow, by which means all danger of clogging, choking, or false planting is avoided, as there is nothing but the weight of the few seeds to be dropped to guard against.

Q is a shoe for opening the furrow for the seed and then closing up the earth over the seed again, the tube O leading down into the center of said shoe.

$r$ $r$ are small openings in the sides of the shoe for allowing the loose mellow earth to pass in over the grain dropped in the furrow, to be finally covered by the heel of the shoe and then pressed by the rollers G. The shoe is hung by rods $s$ $s$ to a bar, T, and by means of a lever, W, said shoe may be raised up out of the ground to avoid obstructions or in passing from place to place.

Having thus fully described the nature of my invention, what I claim therein as new, and desire to secure by Letters Patent, is—

Raising the seed to be planted up in a cup or cell vertically, or nearly so, above the height of the grain in the hopper and then tripping a valve in the bottom of said cup or cell and allowing the seeds contained therein to drop through a tube toward the ground, substantially as described.

L. A. BUTTS.

Witnesses:
    A. B. STOUGHTON,
    THOMAS H. UPPERMAN.